(12) United States Patent
Liu et al.

(10) Patent No.: US 10,081,249 B2
(45) Date of Patent: Sep. 25, 2018

(54) METHODS AND SYSTEMS FOR UPDATING OPERATING SYSTEM OF ELECTRIC VEHICLE

(71) Applicant: Beijing Xiaomi Mobile Software Co., Ltd., Haidian District, Beijing (CN)

(72) Inventors: Huayijun Liu, Beijing (CN); Ke Wu, Beijing (CN); Muchen Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/671,841

(22) Filed: Aug. 8, 2017

(65) Prior Publication Data
US 2018/0072162 A1    Mar. 15, 2018

(30) Foreign Application Priority Data
Sep. 12, 2016 (CN) .......................... 2016 1 0819253

(51) Int. Cl.
*B60L 3/12* (2006.01)
*G06F 8/65* (2018.01)
*H04L 29/08* (2006.01)

(52) U.S. Cl.
CPC ................. *B60L 3/12* (2013.01); *G06F 8/65* (2013.01); *H04L 67/34* (2013.01); *B60L 2270/40* (2013.01); *H04L 67/12* (2013.01)

(58) Field of Classification Search
CPC .......... B60L 3/12; B60L 2270/40; G06F 8/65; H04L 67/34; H04L 67/12
See application file for complete search history.

(56) References Cited

U.S. PATENT DOCUMENTS

| | | |
|---|---|---|
| 9,086,941 B1 | 7/2015 | Siegel |
| 2006/0161314 A1 | 7/2006 | Honmura |
| 2009/0119657 A1* | 5/2009 | Link, II .................... G06F 8/64 717/171 |
| 2013/0073672 A1* | 3/2013 | Ayed .......................... G06F 8/61 709/217 |
| 2013/0245884 A1* | 9/2013 | Forutanpour .......... G01S 19/34 701/36 |
| 2015/0040113 A1 | 2/2015 | Muench-Casanova et al. |
| 2015/0301822 A1 | 10/2015 | Takahashi et al. |

OTHER PUBLICATIONS

Extended European Search Report in connection with corresponding EP Application No. 17189360.5, dated Dec. 12, 2017, 7 pages.

* cited by examiner

*Primary Examiner* — Richard M Camby
(74) *Attorney, Agent, or Firm* — Arch & Lake LLP

(57) ABSTRACT

A method, a user terminal, and an electric vehicle are provided for updating a system for the electric vehicle. According to an example of the method, it is determined whether an electric vehicle is in use when receiving a system update operation instruction. A system update function is disabled when determining that the electric vehicle currently is in use. A system update is performed on the electric vehicle in response to the operation instruction when determining that the electric vehicle currently is in a standby status.

17 Claims, 13 Drawing Sheets

METHODS AND SYSTEMS FOR UPDATING OPERATING SYSTEM OF ELECTRIC VEHICLE

CROSS REFERENCE TO RELATED APPLICATION

This application claims priority to Chinese Patent Application No. 201610819253.0 entitled "METHOD AND DEVICE FOR UPDATING OPERATING SYSTEM" which is filed on Sep. 12, 2016, the entire content of which is incorporated herein by reference.

TECHNICAL FIELD

The present disclosure relates to updating an operating system for an electric vehicle.

BACKGROUND

Commercially available electric vehicle may include, for example, electric scooters, electric self-balancing scooters and so on. Most of the electric vehicle have achieved intelligent control. Intelligent control of the electric vehicle may be achieved by means of operation panels provided on the electric vehicle or applications (APPs) installed on user terminals, for example, querying detailed information of devices, carrying out firmware update or speed setting, etc. Potential hazards may be caused when systems are being updated while users are riding on the electric vehicle.

SUMMARY

The present disclosure provides a method and a device for updating an operating system of an electric vehicle to solve a problem of posing a threat to user personal security due to performing system update when the user is riding the electric vehicle.

According to a first aspect of the present disclosure, there is provided a method of updating an operating system of an electric vehicle, which may include: determining, by a processor in communication with the electrical vehicle, whether the electric vehicle is in use when receiving a system update operation instruction; disabling, by the processor, a system update function when the electric vehicle currently is in use; and updating, by the processor, the system of the electric vehicle in response to the operation instruction when the electric vehicle currently is in a standby status.

According to a second aspect of the present disclosure, there is provided a method of updating an operating system of an electric vehicle, which may include: determining, by the electric vehicle, whether the electric vehicle is in use when receiving a system update operation instruction; disabling, by the electric vehicle, a system update function when the electric vehicle currently is in use; and updating, by the electric vehicle, the system of the electric vehicle in response to the operation instruction when the electric vehicle currently is in a standby status. According to a third aspect of the present disclosure, there is further provided a device for updating an operating system, which may include: a processor, and a non-transitory machine-readable storage medium for storing machine-executable instructions. The processor is caused by the machine-executable instructions to: determine whether an electric vehicle is in use when receiving a system update operation instruction; disable a system update function when the electric vehicle currently is in use; and update the system of the electric vehicle in response to the operation instruction when the electric vehicle currently is in a standby status. According to a fourth aspect of the present disclosure, there is further provided an electric vehicle, which may include: a processor, and a non-transitory machine-readable storage medium for storing machine-executable instructions. The processor is caused by the machine-executable instructions to: determine whether the electric vehicle is in use when receiving a system update operation instruction; when the electric vehicle currently is in use, disable a system update function; and when the electric vehicle currently is in a standby status, update a system for the electric vehicle in response to the system update operation instruction.

It is to be understood that both the foregoing general description and the following detailed description are exemplary and explanatory only and are not restrictive of the present disclosure.

BRIEF DESCRIPTION OF DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to exemplary examples, examples of which are illustrated in the accompanying drawings. The following description refers to the accompanying drawings in which the same numbers in different drawings represent the same or similar elements unless otherwise represented. The implementations set forth in the following description of exemplary examples do not represent all implementations consistent with the disclosure. Instead, they are merely examples of apparatuses and methods consistent with aspects related to the disclosure as recited in the appended claims.

An example is taken in which the electric vehicle is an electric self-balancing vehicle. When a user is riding the electric self-balancing vehicle or remotely controls the electric self-balancing vehicle in motion, a sensor such as a gyroscope sensor or an accelerometer sensor may be shielded and thus the self-balancing vehicle may be caused to be out of balance if a system update operation is executed on the electric self-balancing vehicle, which may pose a threat to the personal safety of the user. Therefore, the present disclosure provides a method of updating an operating system, referring to FIG. 1, which illustrates a flowchart of a method of updating an operating system according to one or more embodiments of the present disclosure, the method may include following acts. The acts may be implemented by one or more processors. The one or more processors may be installed in a user terminal or integrated with the electric vehicle. In either case, the one or more processors are in communication with the electric vehicle.

At block 11, it may be determined whether an electric vehicle is in use when receiving a system update operation instruction. The system update operation instruction may be sent from a server to the electric vehicle directly or may be sent to a mobile phone bound with the electric vehicle. The system update operation instruction may include an update or upgrade information, which may be used to update firmware, operating system, or other software installed on the electric vehicle.

At block 12, a system update function may be disabled when the electric vehicle currently is in use.

At block 13, system update may be performed on the electric vehicle in response to the operation instruction when the electric vehicle currently is in a standby status.

Figure 1:
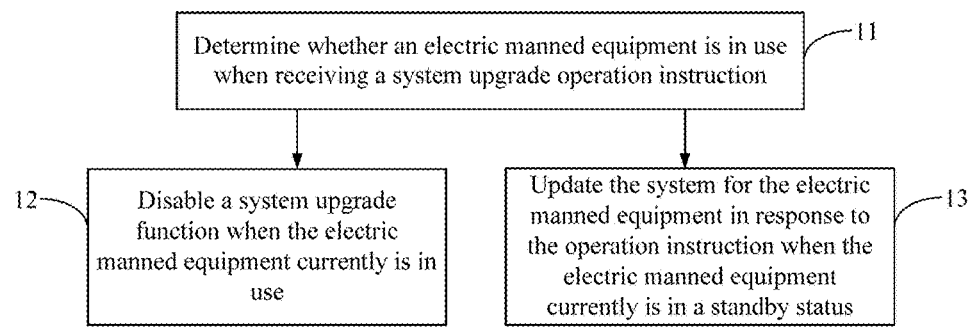
FIG. 1 illustrates a flowchart of a method of updating an operating system according to one or more embodiments of the present disclosure.

In the following, an application scenario where the method of updating an operating system as shown in FIG. 1 is used may be described in combination with a schematic scenario diagram (FIG. 2A) of updating an operating system according to one or more embodiments of the present disclosure and another schematic scenario diagram (FIG. 2B) of updating an operating system according to one or more embodiments of the present disclosure.

Figure 2A:
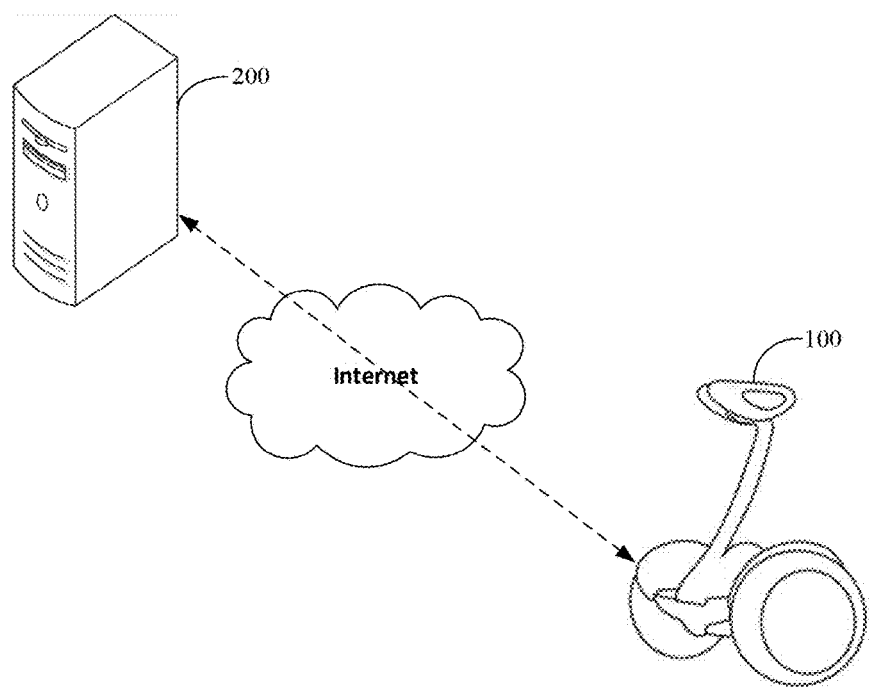
FIG. 2A illustrates a schematic scenario diagram of updating an operating system according to one or more embodiments of the present disclosure.

In the application scenario as shown in FIG. 2A, the electric self-balancing vehicle 100 is provided with a control panel. The user may implement system update of a software system in the electric self-balancing vehicle by downloading an update software from an application server 200 via a network connection by means of a system update function set up in the control panel, for example, by triggering a "Firmware Update" button on a liquid crystal display panel.

In FIG. 2A, the electric self-balancing vehicle 100 may implement linkage with an APP installed in a mobile phone 300 via a WIFI network, Bluetooth connection or a mobile communication network. That is, by means of the mobile phone APP, detailed information of the electric self-balancing vehicle may be viewed, the running speed of the electric self-balancing vehicle may be set up, and remote operation such as system update may be performed on the electric self-balancing vehicle. When the user triggers the "Firmware Update" button in the mobile phone APP, the mobile phone 300 may first download the update software from the application server 200, and then send the update software to the electric self-balancing vehicle 100 via a wireless connection such as WIFI or Bluetooth to control the electric self-balancing vehicle 100 for software system update. Returning to FIG. 1, at block 11, it is determined whether an electric vehicle is in use when receiving a system update operation instruction.

Figure 2B:
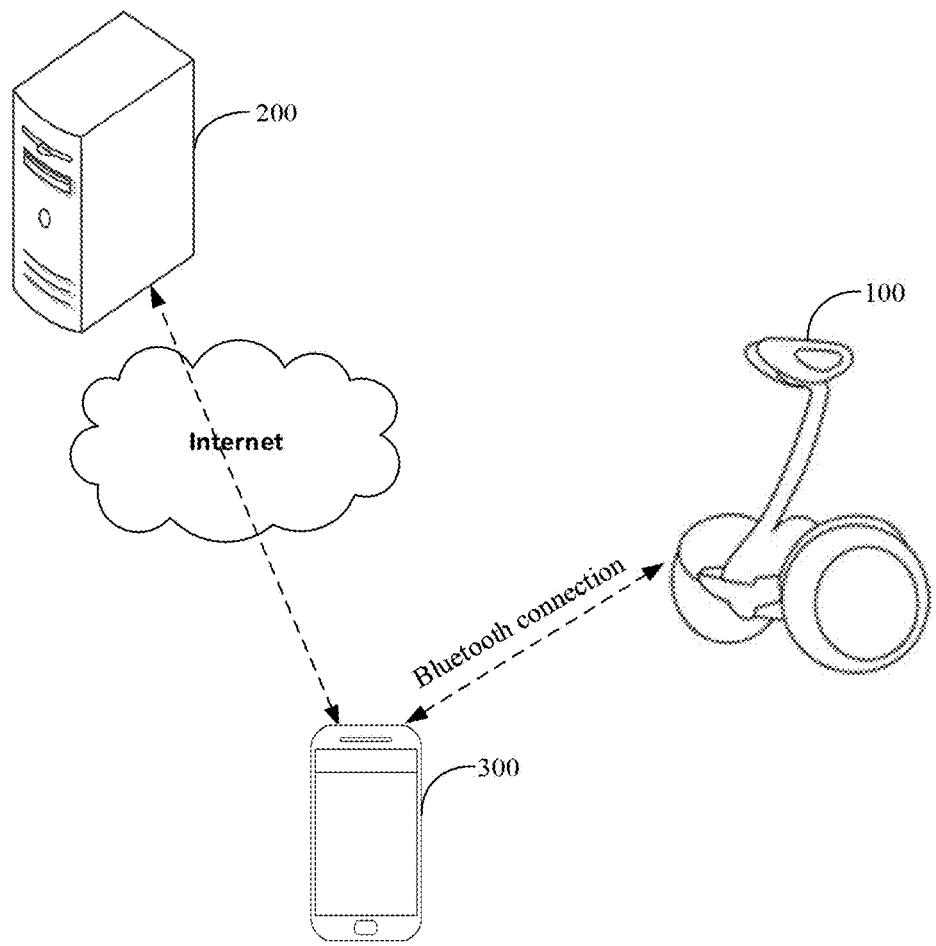
FIG. 2B illustrates a schematic scenario diagram of updating an operating system according to one or more embodiments of the present disclosure.

In this example of the present disclosure, for the scenario as shown in FIG. 2A, after receiving the system update operation instruction, the electric vehicle may not immediately execute the system update operation, but may first detect whether the electric vehicle currently is in use. For the scenario as shown in FIG. 2B, after receiving the system update operation instruction, the user terminal may first detect whether the electric vehicle establishing a connection with the user terminal in advance is in use. In this way, it may be avoided to execute system update when the user is riding the electric self-balancing vehicle or the electric self-balancing vehicle is in a remote control status of motion, thereby preventing the user from being wounded due to the self-balancing vehicle being out of balance.

Based on different application scenarios, implementations of the block 11 may include the following two cases.

Figure 3:
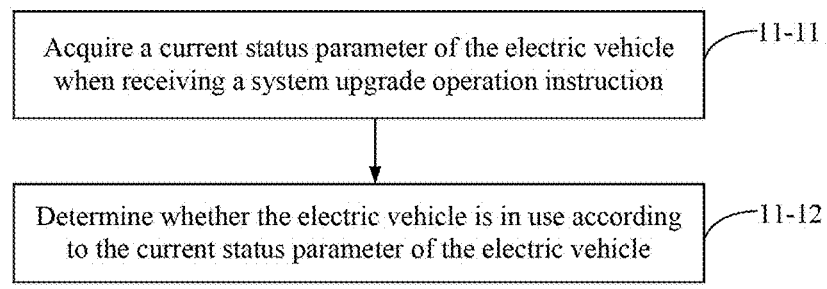
FIG. 3 illustrates a flowchart of another method of updating an operating system according to one or more embodiments of the present disclosure.

In the first case, corresponding to the schematic scenario diagram as shown in FIG. 2A, referring to FIG. 3, a flowchart of another method of updating an operating system according to one or more embodiments, the block 11 may include following blocks.

At block 11-11, a current status parameter of the electric vehicle is acquired after receiving a system update operation instruction.

Still taking an example in which the electric vehicle is the electric self-balancing vehicle in FIG. 2A, after receiving the system update operation instruction triggered by the user via the control panel arranged on the vehicle body, the electric self-balancing vehicle 100 may acquire data detected by each sensor, for example, the current load weight detected by a weight sensor, or the current running speed detected by an accelerometer sensor.

At block 11-12, it is determined whether the electric vehicle is in use according to the current status parameter of the electric vehicle.

In this example of the present disclosure, it may be determined whether the electric self-balancing vehicle currently is in use according to the current load weight and/or the current running speed of the electric self-balancing vehicle. For example, it may be determined that the electric self-balancing vehicle currently is in use when the current load weight of the electric self-balancing vehicle is greater than 0, or the current running speed of the electric self-balancing vehicle is greater than 0, or both the above conditions are met simultaneously. In this example of the present disclosure, the electric self-balancing vehicle being in use may include: the electric self-balancing vehicle is in a riding status, or the electric self-balancing vehicle is in a remote control status of motion, etc.

In the second case, corresponding to the schematic scenario diagram as shown in FIG. 2B, applied to a user terminal, implementation of the block 11 may include following two manners.

Figure 4:
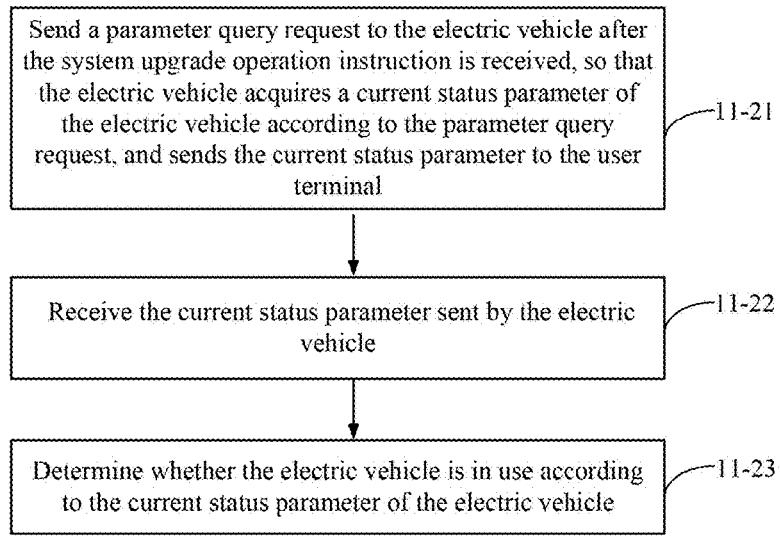
FIG. 4 illustrates a flowchart of still another method of updating an operating system according to one or more embodiments of the present disclosure.

In the first manner, referring to FIG. 4, which illustrates a flowchart of still another method of updating an operating system according to one or more embodiments, the block 11 may include following blocks.

At block 11-21, after the system update operation instruction is received, a parameter query request may be sent to the electric vehicle so that the electric vehicle acquires a current status parameter of the electric vehicle according to the parameter query request, and sends the current status parameter to the user terminal.

In the application scenario as shown in FIG. 2B, after receiving the system update operation instruction, the mobile phone 300 sends a parameter query request to the electric self-balancing vehicle, wherein the parameter query request is used for requesting the electric self-balancing vehicle to query the current status parameter of the electric self-balancing vehicle. After receiving the parameter query request, the electric self-balancing vehicle 100 may acquire the current status information of the electric self-balancing vehicle, for example, the current load weight or the current running speed of the electric self-balancing vehicle, and send the current status parameter to the mobile phone 300.

At block 11-22, the current status parameter sent by the electric vehicle may be received.

In the present disclosure, the user terminal may receive data sent by the electric self-balancing vehicle by way of Bluetooth connection or WIFI connection.

At block 11-23, it is determined whether the electric vehicle is in use according to the current status parameter of the electric vehicle.

In this example of the present disclosure, it may be determined whether the electric vehicle currently is in use according to the current load weight and/or the current running speed of the electric vehicle.

Figure 5:
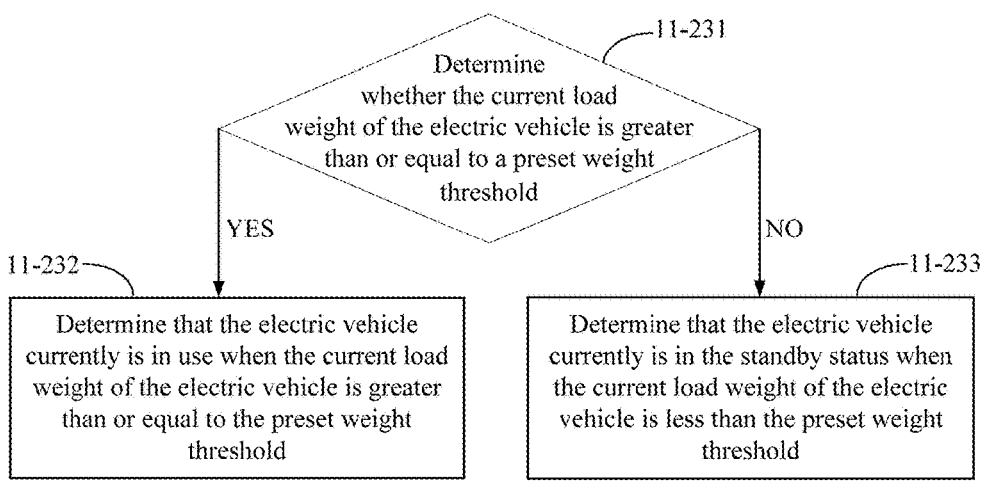
FIG. 5 illustrates a flowchart of still another method of updating an operating system according to one or more embodiments of the present disclosure.

Optionally, in another example of the present disclosure, specifically it may be determined whether the electric self-balancing vehicle currently is in use according to the current load weight of the electric self-balancing vehicle. Referring to FIG. 5, which illustrates a flowchart of still another method of updating an operating system according to one or more embodiments, the block 11-23 may include following blocks.

At block 11-231, it is decided whether the current load weight of the electric vehicle is greater than or equal to a preset weight threshold.

In this example of the present disclosure, a weight bearing threshold may be set up according to adopter crowd of the electric vehicle. For example, if the electric vehicle is applicable to adopters above five years old, a minimum threshold of the weight bearing threshold may be set up according to an average weight of five-years-old children, for example 15 kg. A lower threshold may be set up, for example 0 kg.

At block 11-232, it is determined that the electric vehicle currently is in use when the current load weight of the electric vehicle is greater than or equal to the preset weight threshold.

At block 11-233, it is determined that the electric vehicle currently is in the standby status when the current load weight of the electric vehicle is smaller than the preset weight threshold.

Still taking the electric self-balancing vehicle as an example, it is determined that the electric self-balancing vehicle currently is in use when the current load weight of the electric self-balancing vehicle is greater than or equal to 15 kg. Otherwise it may be determined that the electric self-balancing vehicle currently is in the standby status.

In this example of the present disclosure, by detecting whether the electric vehicle currently is in use according to the current load weight of the electric vehicle, it may be accurately determined that the electric vehicle currently is in use no matter the user is riding or gets on for riding. In this way, the personal security of the user may be guaranteed when the user is riding or gets on for riding.

Figure 6:
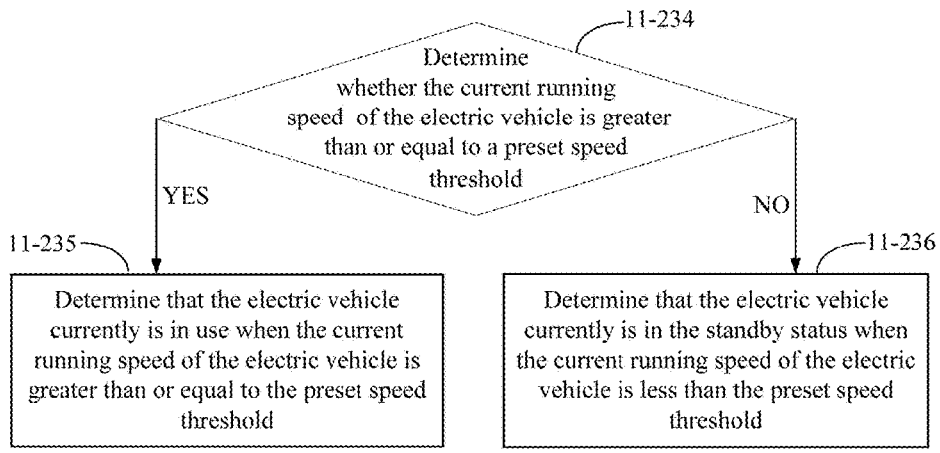
FIG. 6 illustrates a flowchart of still another method of updating an operating system according to one or more embodiments of the present disclosure.

In another example of the present disclosure, also it may be determined whether the electric self-balancing vehicle currently is in use according to the current running speed of the electric self-balancing vehicle. Referring to FIG. 6, which illustrates a flowchart of still another method of updating an operating system according to one or more embodiments, the block 11-23 may include following blocks.

At block 11-234, it is decided whether the current running speed of the electric vehicle is greater than or equal to a preset speed threshold.

In this example of the present disclosure, a speed threshold may be preset for the electric vehicle to decide whether the electric vehicle is in use. For example, an ex-factory speed threshold may be set as 1 km/h, or a lower threshold may be set up, for example, 0 km/h.

The electric vehicle may determine the current running speed according to a speed detecting sensor such as an accelerometer sensor.

At block 11-235, it is determined that the electric vehicle currently is in use when the current running speed of the electric vehicle is greater than or equal to the preset speed threshold.

At block 11-236, it is determined that the electric vehicle currently is in the standby status when the current running speed of the electric vehicle is less than the preset speed threshold.

Still taking the electric self-balancing vehicle as an example, it is determined that the electric self-balancing vehicle currently is in use when the current running speed of the electric self-balancing vehicle is greater than or equal to 1 km/h. Otherwise it may be determined that the electric self-balancing vehicle currently is in the standby status.

In this example of the present disclosure, it may be accurately determined whether the electric vehicle currently is in use according to the current running speed. In this way, the running safety of the electric vehicle may be ensured when the user is riding or the electric vehicle is in the remote control status of motion.

Figure 7:
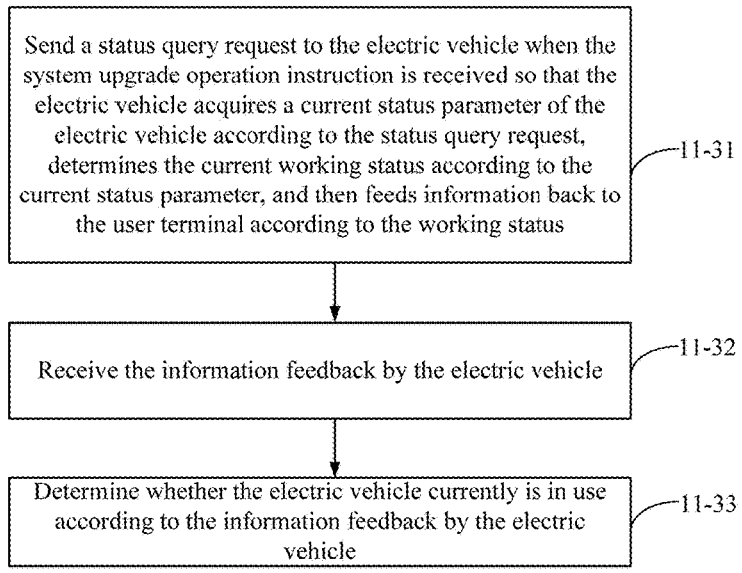
FIG. 7 illustrates a flowchart of still another method of updating an operating system according to one or more embodiments of the present disclosure.

In the second manner, referring to FIG. 7, which illustrates a flowchart of still another method of updating an operating system according to one or more embodiments, the block 11 may include following blocks.

At block 11-31, a status query request may be sent to the electric vehicle after the system update operation instruction is received so that the electric vehicle acquires a current status parameter of the electric vehicle according to the status query request, determines the current working status according to the current status parameter, and then feeds information back to the user terminal according to the working status.

In the application scenario as shown in FIG. 2B, after receiving the system update operation instruction, the mobile phone 300 may send a status query request to the electric self-balancing vehicle 100, wherein the status query request is used for requesting the electric self-balancing vehicle to query the current status parameter of the electric self-balancing vehicle. After receiving the status query request, the electric self-balancing vehicle 100 may first acquire the current status information of the electric self-balancing vehicle 100, for example, the current load weight and the current running speed of the electric self-balancing vehicle; then perform the blocks 11-23~111-233 according to the current status information such as the current load weight, or perform the blocks 11-23~11-236 according to the current running speed, perform the blocks 11-23~11-236 according to the current load weight and the current running speed, so as to determine the current working status (including use or standby status) of the electric self-balancing vehicle; and feed information back to the smart mobile phone 300 according to the current working status.

For example, when the electric self-balancing vehicle determines itself currently to be in use, the electric self-balancing vehicle may send, to the smart mobile phone 300, first feedback information indicating that the electric self-balancing vehicle currently is in use. When the electric self-balancing vehicle determines itself currently to be in the standby status, the electric self-balancing vehicle may send, to the smart mobile phone 300, second feedback information indicating that the electric self-balancing vehicle currently is in the standby status, or may not send the feedback information to the smart mobile phone.

At block 11-32, the feedback information sent by the electric vehicle may be received.

The above feedback information may be the first feedback information or the second feedback information.

At block 11-33, it is determined whether the electric vehicle currently is in use according to the feedback information of the electric vehicle.

When the feedback information received by the smart mobile phone 300 is the first feedback information, it is determined that the electric self-balancing vehicle 100 currently is in use. When the feedback information received by the smart mobile phone 300 is the second feedback information, it is determined that the electric self-balancing vehicle 100 currently is in the standby status.

Alternatively, it is determined, by default, that the electric self-balancing vehicle 100 currently is in the standby status when the smart mobile phone 300 does not receive any feedback information from the electric self-balancing vehicle 100 within preset time, for example, within 10 minutes.

By using the above second manner to determine whether the electric vehicle is in use, data transmission amount between the user terminal and the electric vehicle may be effectively reduced, so that the user terminal may quickly determine the current status of the electric vehicle according to the received feedback information.

At block 12, a system update function may be disabled when the electric vehicle currently is in use.

Figure 8:
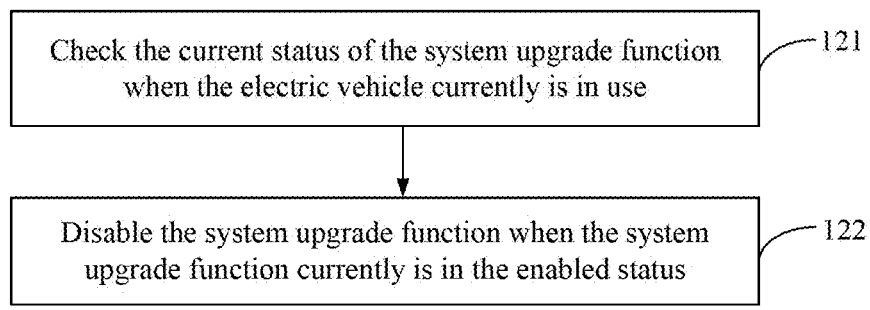
FIG. 8 illustrates a flowchart of still another method of updating an operating system according to one or more embodiments of the present disclosure.

Referring to FIG. 8, which illustrates a flowchart of still another method of updating an operating system according to one or more embodiments, the block 12 may include following blocks.

At block 121, the current status of the system update function may be checked when the electric vehicle currently is in use.

In this example of the present disclosure, the status of the system update function may mainly include: an enabled status and a disabled status. Before the system update operation instruction is received, the user may trigger to perform system update when the system update function is in the enabled status. When the system update function is in the disabled status, the system update operation is not responsible no matter the user how operates.

At block 122, if the system update function currently is in the enabled status, the system update function may be disabled. For example, the system update function may be automatically shielded, for example, the system update button in the application interface may become gray and being unselectable.

Otherwise, when the system update function currently is in the disabled status, for example, in the gray and unselectable status, the current status may be maintained.

In another example of the present disclosure, when the electric vehicle was undergoing software system update at a previous moment but it is detected at the current moment that the electric vehicle starts to enter into use, disabling the system update function at block 12 specifically may include: disabling the system update function and suspending the software system update of the electric vehicle.

At block 13, system update may be performed on the electric vehicle in response to the operation instruction when the electric vehicle currently is in the standby status.

Figure 9:
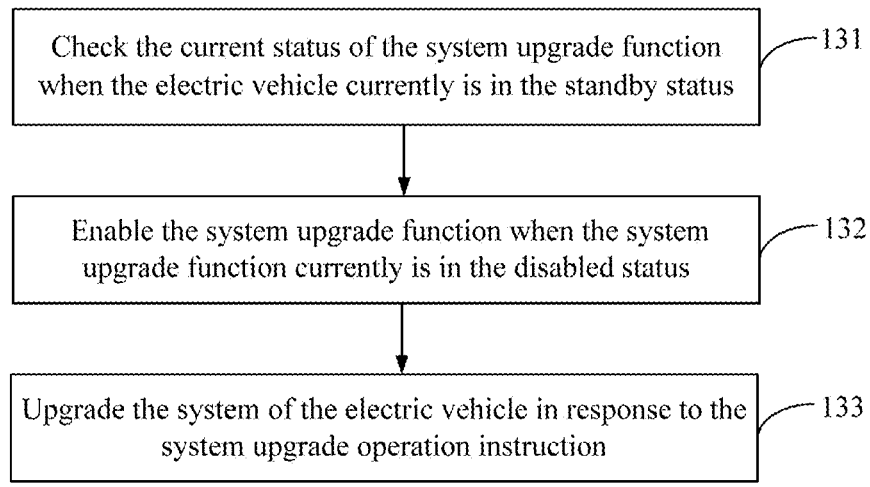
FIG. 9 illustrates a flowchart of still another method of updating an operating system according to one or more embodiments of the present disclosure.

Similarly, referring to FIG. 9, which illustrates a flowchart of still another method of updating an operating system according to one or more embodiments, the block 13 may include following blocks.

At block 131, the current status of the system update function may be checked when the electric vehicle currently is in the standby status.

The same as above, the status of the system update function may mainly include: the enabled status and the disabled status.

At block 132, if the system update function currently is in the disabled status, the system update function may be enabled to perform system update on the electric vehicle.

Otherwise, when the system update function currently is in the enabled status, for example, in green and selectable status, the current enabled status may be maintained.

At block 133, system update may be performed on the electric vehicle in response to the system update operation instruction.

When the electric vehicle is in the standby status, the personal safety of the user may not be affected by the system update. Therefore, the system update function may be maintained in the enabled status, so that the user triggers the system update function via an operation panel arranged on the electric vehicle or a mobile phone APP to implement the system update of the electric vehicle and improve the performance of the device.

Figure 10:
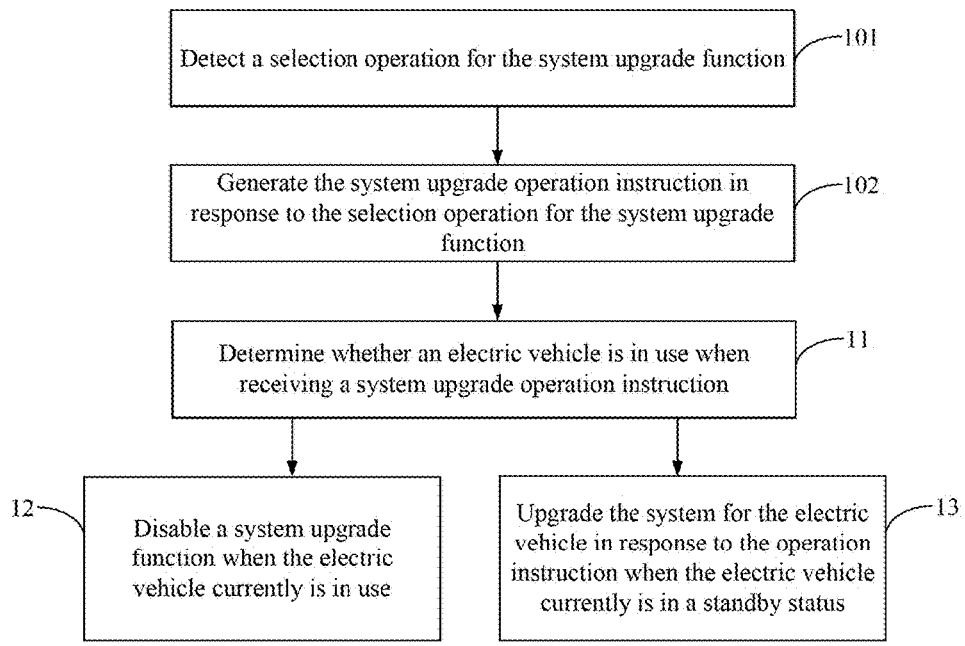
FIG. 10 illustrates a flowchart of still another method of updating an operating system according to one or more embodiments of the present disclosure.

Referring to FIG. 10, which illustrates a flowchart of still another method of updating an operating system according to one or more embodiments, on the basis of the example as shown in FIG. 2, before the block 11, the method may further include following blocks.

At block 101, a selection operation for the system update function may be detected.

Figure 11:
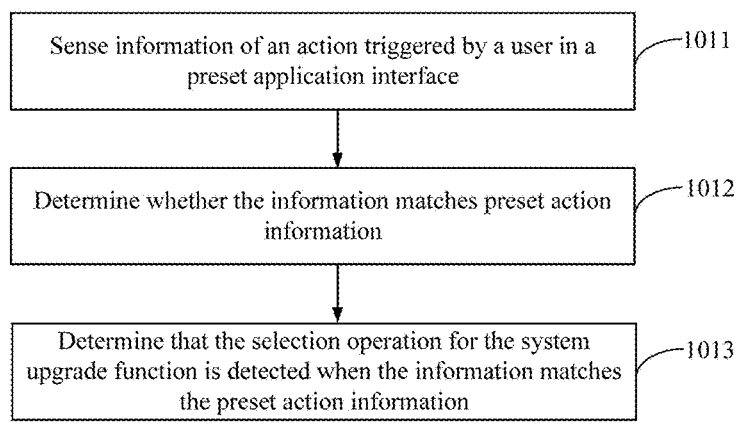
FIG. 11 illustrates a flowchart of still another method of updating an operating system according to one or more embodiments of the present disclosure.

Referring to FIG. 11, which illustrates a flowchart of still another method of updating an operating system according to one or more embodiments, the blocks 101 may include following blocks.

At block 1011, information of an action triggered by a user in a preset application interface may be sensed.

The control panel of the electric vehicle or the user terminal may be provided with sensors such as a pressure sensor or an infrared sensor. The control panel or the display screen of the user terminal may be a liquid crystal touch screen. When the user triggers an action on the display screen or makes a gesture within a preset range, the electric vehicle or the terminal may sense information of the user's action by means of the built-in sensors.

At block 1012, it is decided whether information of the user-triggered action matches preset action information.

At block 1013, it is determined that the selection operation for the system update function is detected when the information of the user-triggered action matches the preset action information.

Taking the scenario as shown in FIG. 2B as an example, generally client-side software may be provided with an action information list when initialized, wherein the list may include a corresponding relationship between information of action and an operation instruction. Exemplarily, as shown in Table I:

TABLE I

| Information of action | Operation instruction |
| --- | --- |
| Clicking a system update function area | Starting system update |
| double clicking the system update function area | Suspending system update |
| Circling within the system update function area | Terminating system update |

At block 102, the system update operation instruction may be generated in response to detecting the selection operation for the system update function.

Figure 12:
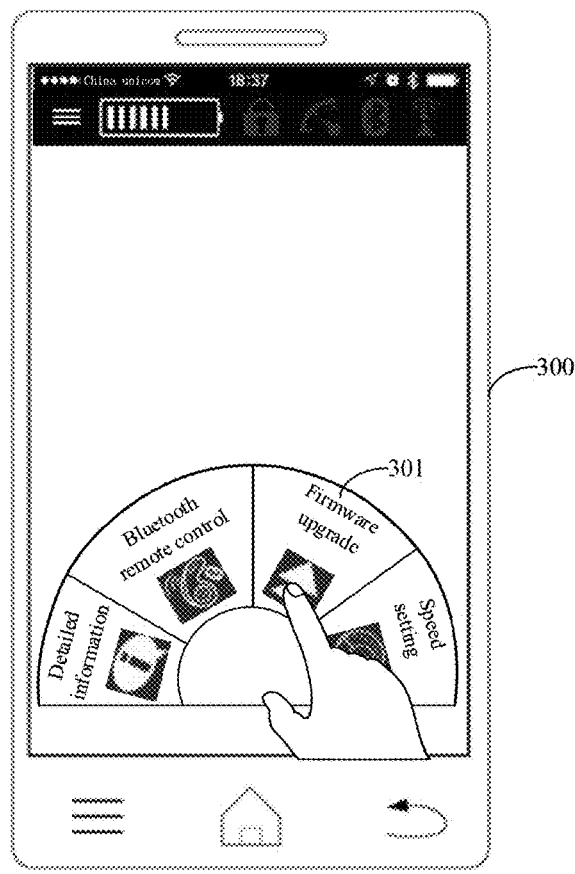
FIG. 12 illustrates a schematic scenario diagram of still another method of updating an operating system according to one or more embodiments of the present disclosure.

Referring to FIG. 12, which illustrates a schematic scenario diagram of still another method of updating an operating system according to one or more embodiments, the application interface of the smart mobile phone 300 is provided with a plurality of functional areas, for example, a "detailed information" querying functional area, a "Bluetooth remote control" functional area, a "firmware update" functional area and a "speed setting" functional area, etc.

The action information list may be queried after the user terminal 300 detects information of the action triggered by the user within the system update function area 301. Referring to Table I, if the preset action information corresponding to the "Starting system update" operation instruction is assumed to be the "Clicking a system update function area", an operation instruction for starting system update may be generated when the user terminal 300 detects that the user triggers a clicking action within the system update functional area. The system update may also be referred to as system upgrade by people having ordinary skill in the art.

It is to be noted that in the examples of the present disclosure, the user terminal may be any smart terminal capable of Internet access, for example, a smart mobile phone, a PDA (personal digital assistant), a tablet computer, a wearable device and other electronic devices. The server end may be an application server, a server cluster or a cloud platform. The electric vehicle may be an electric scooter, a two-wheeled electric self-balancing vehicle, a one-wheeled electric self-balancing vehicle, and the like.

In conclusion, by using the method of updating an operating system provided by the present disclosure, after a user-triggered system update operation instruction is received, the system updating is not immediately carried out, instead it is first determined whether the electric vehicle is currently in use. The system update function is disabled when the electric vehicle is in use. In this way, it may be avoided to execute system update when the user is riding the electric self-balancing vehicle, thereby preventing the user from being wounded due to the self-balancing vehicle being out of balance. Therefore, the personnel security of the user may be ensured when the user is riding the electric vehicle, the electric vehicle is ensured to run smoothly, the security and intelligence of the electric vehicle may be enhanced, and further the user experience of the electric vehicle may be improved.

It should be explained that, for a brief description, the foregoing method examples are described as a combination of a series of motions. However, those skilled in the art should know that the present disclosure is not limited by sequences of the motions described. This is because some blocks may be performed in other sequences or be performed simultaneously in accordance with the present disclosure.

In addition, those skilled in the art should also learn that the examples described in the specification are illustrative, and involved motions and modules are not necessary for the present disclosure.

Corresponding to the foregoing examples of an application function implementing method, the present disclosure also provides examples of an application function implementing apparatus and a corresponding terminal.

Figure 13:
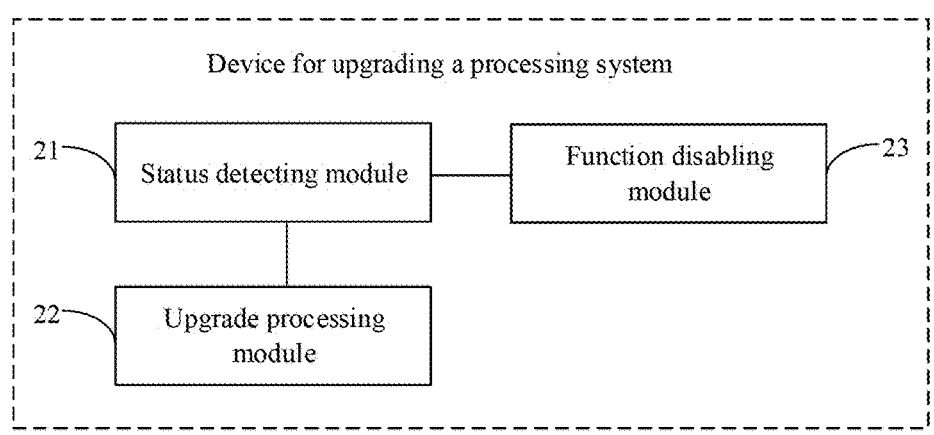
FIG. 13 illustrates a block diagram of a device for updating an operating system according to one or more embodiments of the present disclosure.

Referring to FIG. 13, which illustrates a block diagram of a device for updating an operating system according to one or more embodiments, the device may include:

a status detecting module 21, configured to detect whether an electric vehicle is in use when a system update operation instruction is received;

a function disabling module 22, configured to disable a system update function when the electric vehicle currently is in use; and an update operating module 23, configured to update the system of the electric vehicle in response to the operation instruction when the electric vehicle currently is in a standby status.

Figure 14:
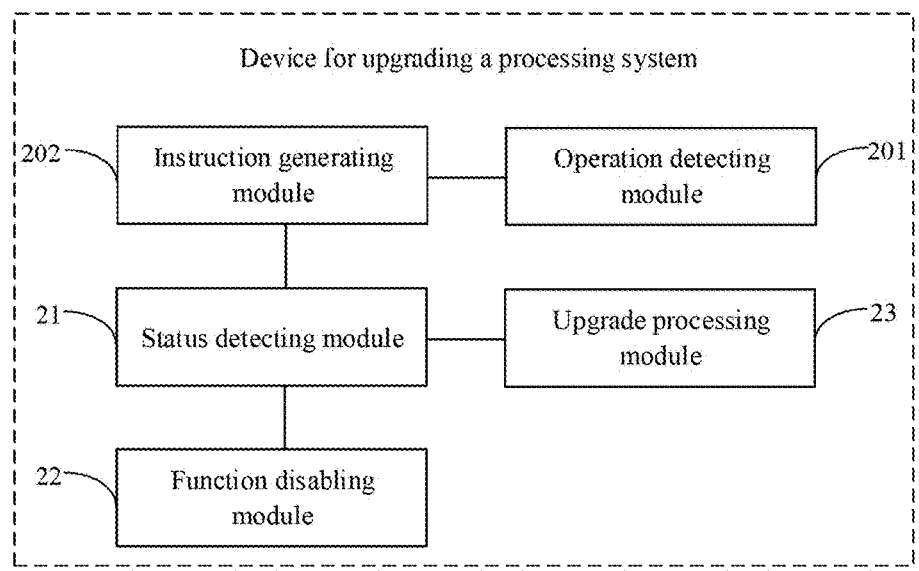
FIG. 14 illustrates a block diagram of another device for updating an operating system according to one or more embodiments of the present disclosure.

Referring to FIG. 14, which illustrates a block diagram of a device for updating an operating system according to one or more embodiments, on the basis of the example as shown in FIG. 13, the device may further include:

an operation detecting module 201, configured to detect a selection operation for the system update function; and an instruction generating module 202, configured to generate the system update operation instruction in response to the selection operation for the system update function.

Figure 15:
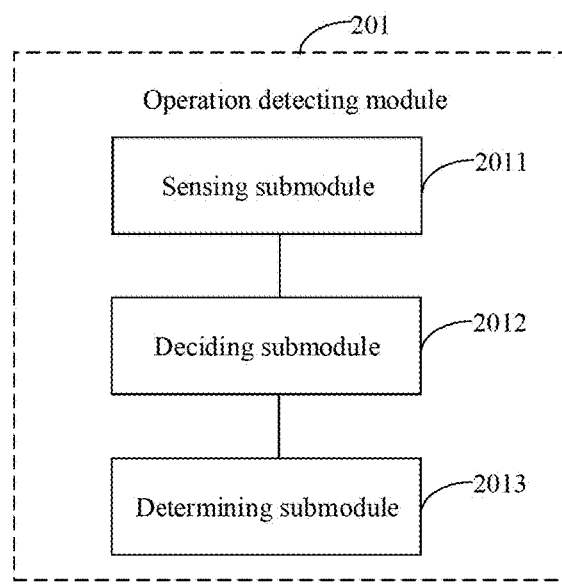
FIG. 15 illustrates a block diagram of still another device for updating an operating system according to one or more embodiments of the present disclosure.

Referring to FIG. 15, which illustrates a block diagram of a device for updating an operating system according to one or more embodiments, on the basis of the example as shown in FIG. 14, the operation detecting module 201 may further include:

a sensing submodule 2011, configured to sense information of an action triggered by a user in a preset application interface;

a deciding submodule 2012, configured to decide whether the information of the action triggered by the user matches preset action information; and a determining submodule 2013, configured to determine that the selection operation for the system update function is detected when the information of the action triggered by the user matches the preset action information.

Figure 16:
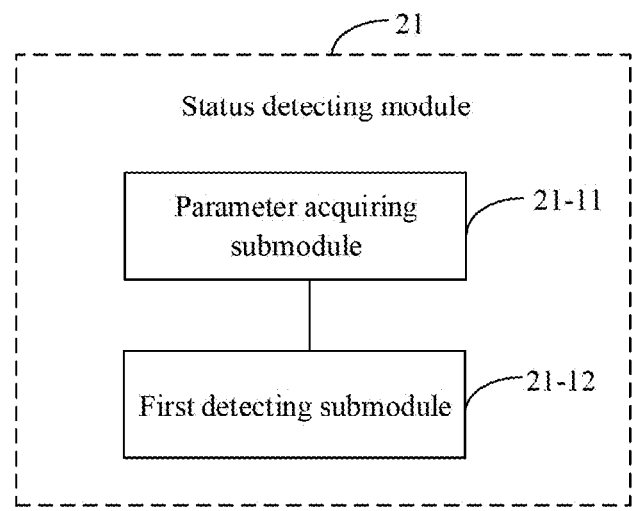
FIG. 16 illustrates a block diagram of still another device for updating an operating system according to one or more embodiments of the present disclosure.

Referring to FIG. 16, which illustrates a block diagram of a device for updating an operating system according to one or more embodiments, on the basis of the example as shown in FIG. 13, the status detecting module 21 may include:

a parameter acquiring submodule 21-11, configured to acquire a current status parameter of the electric vehicle after a system update operation instruction is received; and a first detecting submodule 21-12, configured to determine, according to the current status parameter of the electric vehicle, whether the electric vehicle is in use.

Figure 17:
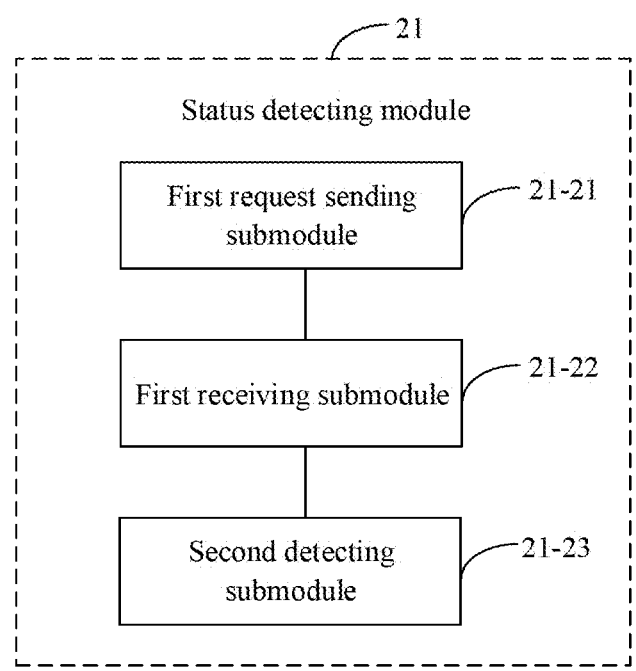
FIG. 17 illustrates a block diagram of still another device for updating an operating system according to one or more embodiments of the present disclosure.

Referring to FIG. 17, which illustrates a block diagram of a device for updating an operating system according to one or more embodiments, on the basis of the example as shown in FIG. 13, the status detecting module 21 may include:

a first request sending submodule 21-21, configured to send a parameter query request to the electric vehicle after the system update operation instruction is received so that the electric vehicle acquires a current status parameter of the electric vehicle according to the parameter query request and sends the current status parameter to the user terminal;

a first receiving submodule 21-22, configured to receive the current status parameter sent by the electric vehicle; and a second detecting submodule 21-23, configured to determine, according to the current status parameter of the electric vehicle, whether the electric vehicle is in use.

Figure 18:
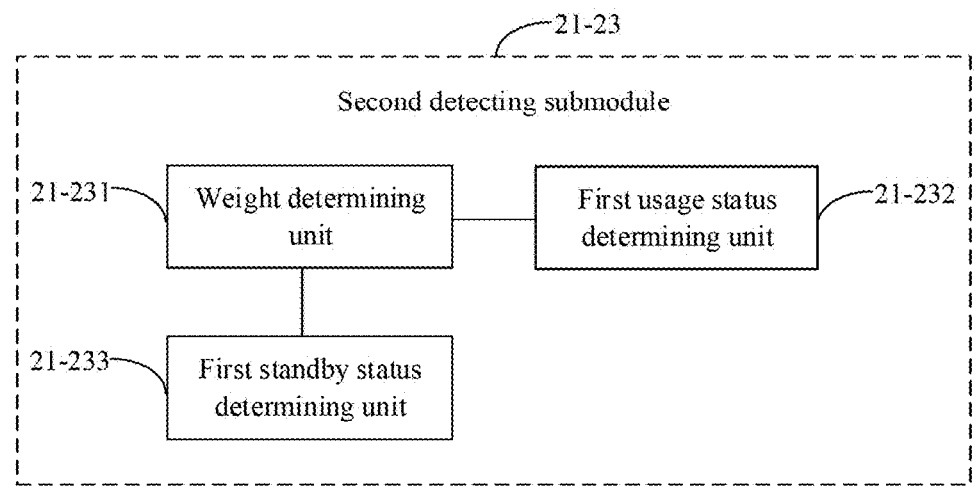
FIG. 18 illustrates a block diagram of still another device for updating an operating system according to one or more embodiments of the present disclosure.

Referring to FIG. 18, which illustrates a block diagram of a device for updating an operating system according to one or more embodiments, on the basis of the example as shown in FIG. 17, when the current status parameter is a current load weight of the electric vehicle, the second detecting submodule 21-23 may include:

a weight deciding unit 21-231, configured to decide whether the current load weight of the electric vehicle is greater than or equal to a preset threshold;

a first usage status determining unit 21-232, configured to determine that the electric vehicle currently is in use when the current load weight of the electric vehicle is greater than or equal to the preset threshold; and a first standby status determining unit 21-233, configured to determine that the electric vehicle currently is in the standby status when the current load weight of the electric vehicle is less than the preset threshold.

Figure 19:
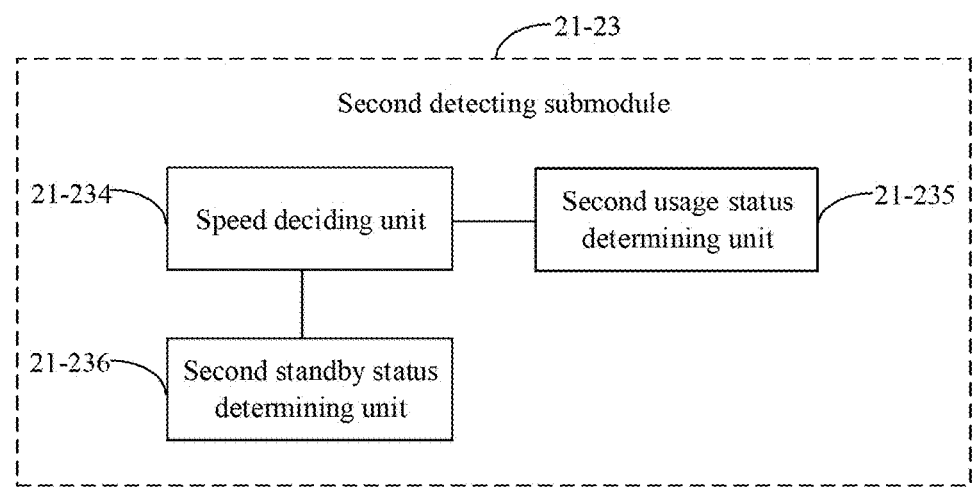
FIG. 19 illustrates a block diagram of still another device for updating an operating system according to one or more embodiments of the present disclosure.

Referring to FIG. 19, which illustrates a block diagram of a device for updating an operating system according to one or more embodiments, on the basis of the example as shown in FIG. 17, when the current status parameter is a current running speed of the electric vehicle, the second detecting submodule 21-23 may include:

a speed deciding unit 21-234, configured to decide whether the current running speed of the electric vehicle is greater than or equal to a preset speed threshold;

a second usage status determining unit 21-235, configured to determine that the electric vehicle currently is in use when the current running speed of the electric vehicle is greater than or equal to the preset speed threshold; or a second standby status determining unit 21-236, configured to determine that the electric vehicle currently is in the standby status when the current running speed of the electric vehicle is less than the preset speed threshold.

Figure 20:
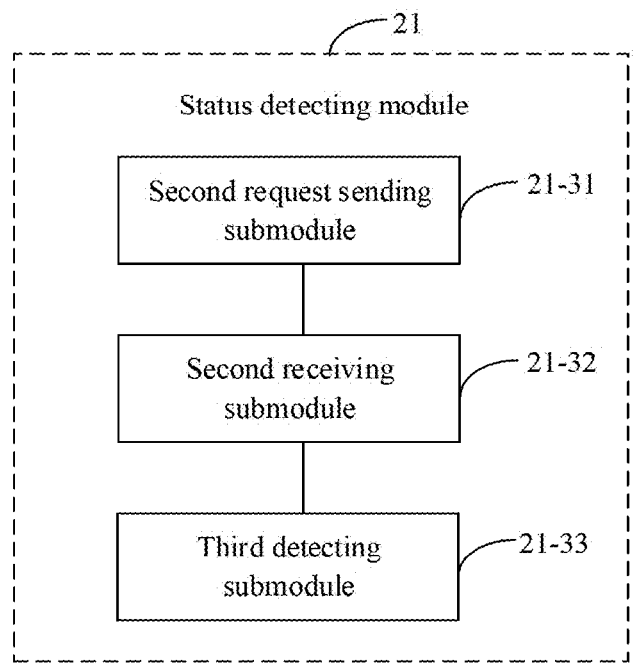
FIG. 20 illustrates a block diagram of still another device for updating an operating system according to one or more embodiments of the present disclosure.

Referring to FIG. 20, which illustrates a block diagram of a device for updating an operating system according to one or more embodiments, on the basis of the example as shown in FIG. 13, the status detecting module 21 may include:

a second request sending submodule 21-31, configured to send a status query request to the electric vehicle after the system update operation instruction is received so that the electric vehicle acquires a current status parameter of the electric vehicle according to the status query request, determines the current working status according to the current status parameter, and then feeds information back to the user terminal according to the working status;

a second receiving submodule 21-32, configured to receive the information feedback by the electric vehicle; and a third detecting submodule 21-33, configured to determine, according to the information feedback by the electric vehicle, whether the electric vehicle currently is in use.

Figure 21:
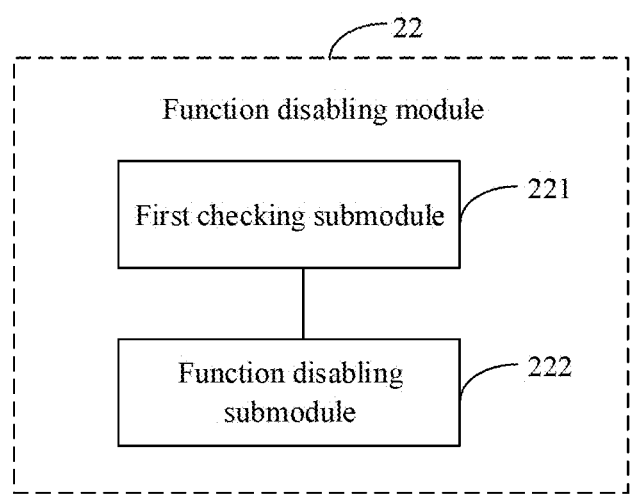
FIG. 21 illustrates a block diagram of still another device for updating an operating system according to one or more embodiments of the present disclosure.

Referring to FIG. 21, which illustrates a block diagram of a device for updating an operating system according to one or more embodiments, on the basis of the example as shown in FIG. 13, the function disabling module 22 may include:

a first checking submodule 221, configured to check a current status of the system update function when the electric vehicle currently is in use; and a function disabling submodule 222, configured to disable the system update function when the system update function currently is in an enabled status.

Figure 22:
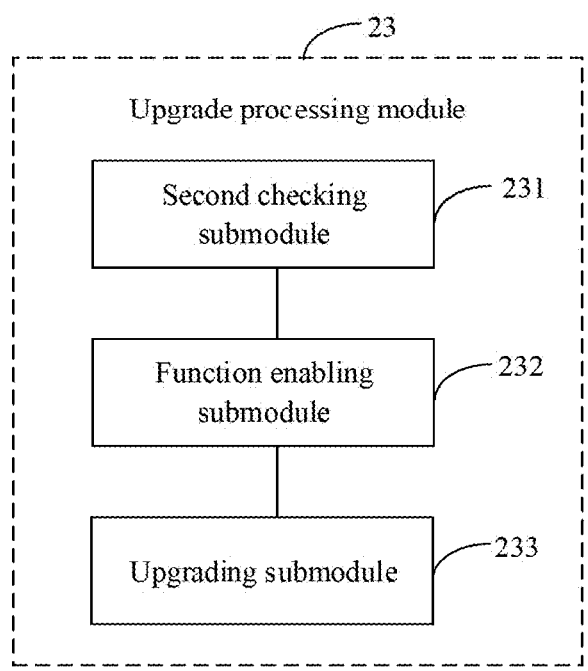
FIG. 22 illustrates a block diagram of still another device for updating an operating system according to one or more embodiments of the present disclosure.

Referring to FIG. 22, which illustrates a block diagram of a device for updating an operating system according to one or more embodiments, on the basis of the example as shown in FIG. 13, the update operating module 23 may include:

a second checking submodule 231, configured to check a current status of the system update function when the electric vehicle currently is in the standby status;

a function enabling submodule 232, configured to enable the system update function when the system update function currently is in a disabled status; and an updating submodule 233, configured to update the system of the electric vehicle in response to the system update operation instruction.

Device examples are basically corresponding to the method examples, and thus method examples can serve as reference. The device examples set forth above are merely exemplary, wherein units described as detached parts can be or not be detachable physically; parts displayed as units can be or not be physical units, i.e., either located at the same place, or distributed on a plurality of network units. Modules can be selected in part or in whole according to the actual needs for realization of solutions of the present disclosure. It is conceivable and executable for those of ordinary skill in the art without creative labor.

The present disclosure further provides a user terminal, including: a processor; and a machine-readable storage medium for storing machine-executable instructions.

The processor may be caused by the machine-executable instructions to:

detect whether an electric vehicle is in use after receiving a system update operation instruction;

disable a system update function when the electric vehicle currently is in use; or update the system of the electric vehicle in response to the operation instruction when the electric vehicle currently is in a standby status.

The processor may be further caused by the machine-executable instructions to: detect a selection operation for the system update function; and generate the system update operation instruction in response to the selection operation for the system update function.

When detecting a selection operation for the system update function, the processor may be further caused by the machine-executable instructions to: sense information of an action triggered by a user in a preset application interface; determine whether the information of the action triggered by the user matches preset action information; and determine that the selection operation for the system update function is detected when the information of the action triggered by the user matches the preset action information.

When detecting whether the electric vehicle is in use, the processor may be further caused by the machine-executable instructions to: send a parameter query request to the electric vehicle in a way that the electric vehicle sends a current status parameter of the electric vehicle to the user terminal according to the parameter query request; receive the current status parameter sent by the electric vehicle; and determine, according to the current status parameter of the electric vehicle, whether the electric vehicle is in use.

The current status parameter is a current load weight of the electric vehicle, and when determining, according to the current status parameter of the electric vehicle, whether the electric vehicle is in use, the processor may be further caused by the machine-executable instructions to: determine whether the current load weight of the electric vehicle is greater than or equal to a preset weight threshold; determine that the electric vehicle currently is in use when the current load weight of the electric vehicle is greater than or equal to the preset weight threshold; or determine that the electric vehicle currently is in the standby status when the current load weight of the electric vehicle is less than the preset weight threshold.

The current status parameter is a current running speed of the electric vehicle, and when determining, according to the current status parameter of the electric vehicle, whether the electric vehicle is in use, the processor may be further caused by the machine-executable instructions to: determine whether the current running speed of the electric vehicle is greater than or equal to a preset speed threshold; determine that the electric vehicle currently is in use when the current running speed of the electric vehicle is greater than or equal to the preset speed threshold; or determine that the electric vehicle currently is in the standby status when the current running speed of the electric vehicle is less than the preset speed threshold.

When detecting whether the electric vehicle is in use, the processor may be further caused by the machine-executable instructions to: send a status query request to the electric vehicle in a way that the electric vehicle feeds back information indicating a current working status of the electric vehicle to the user terminal in response to the status query request; receive the information feedback by the electric vehicle; and determine, according to the information feedback by the electric vehicle, whether the electric vehicle currently is in use.

The present disclosure further provides an electric vehicle, including: a processor; and a machine-readable storage medium for storing machine-executable instructions, wherein the processor is caused by the machine-executable instructions to:

detect whether the electric vehicle is in use when receiving a system update operation instruction;

when the electric vehicle currently is in use,
disable a system update function; or when the electric vehicle currently is in a standby status,
update a system for the electric vehicle in response to the system update operation instruction.

The processor is further caused by the machine-executable instructions to:

detect a selection operation for the system update function; and generate the system update operation instruction in response to the selection operation for the system update function.

when detecting the selection operation for the system update function, the processor is further caused by the machine-executable instructions to:

sense information of an action triggered by a user in a preset application interface; determine whether the sensed information matches preset action information; and determine that the selection operation for the system update function is detected when the information matched the preset action information.

Figure 23:
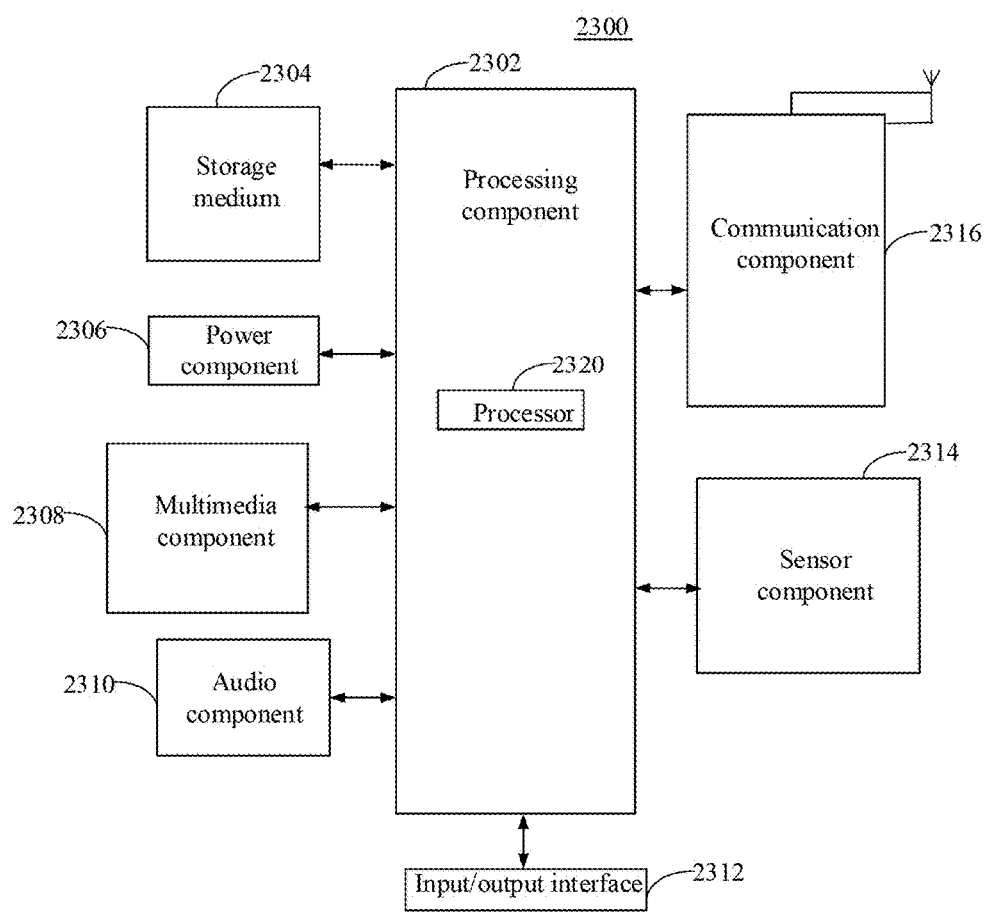
FIG. 23 illustrates a schematic structural diagram of a device into which a method of updating an operating system is applied according to one or more embodiments of the present disclosure.

FIG. 23 illustrates a schematic structural diagram of a device 2300 into which a method of updating an operating system is applied according to one or more embodiments. For example, the device 2300 may be a terminal, and specifically may be a mobile phone, a computer, a digital broadcast terminal, a message transceiver device, a game console, a tablet device, a medical device, a fitness device, a personal digital assistant, and a wearable device such as a smart watch, smart glasses, a smart wristband, smart shoes and the like. The device 2300 may be an electric vehicle, such as an electric scooter and electric self-balancing vehicle.

Referring to FIG. 23, the device 2300 may include one or more of the following components: an operating component 2302, a storage medium 2304, a power component 2306, a multimedia component 2308, an audio component 2310, an input/output (I/O) interface 2312, a sensor component 2314 and a communication component 2316.

The operating component 2302 typically controls overall operations of the device 2300, such as the operations associated with display, telephone calls, data communications, camera operations, and recording operations. The operating component 2302 may include one or more processors 2320 to execute instructions to perform all or part of the blocks in the above described methods. Moreover, the operating component 2302 may include one or more modules which facilitate the interaction between the operating component 2302 and other components. For instance, the operating component 2302 may include a multimedia module to facilitate the interaction between the multimedia component 2308 and the operating component 2302.

The storage medium 2304 is configured to store various types of data to support the operation of the device 2300. Examples of such data include instructions for any applications or methods operated on the device 2300, contact data, phonebook data, messages, pictures, video, etc. The storage medium 2304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2306 provides power to various components of the device 2300. The power component 2306 may include a power management system, one or more power sources, and any other components associated with the generation, management and distribution of power in the device 2300.

The multimedia component 2308 may include a screen providing an output interface between the device 2300 and the user. In some examples, the screen may include a liquid crystal display (LCD) and a touch panel (TP). If the screen includes the touch panel, the screen may be implemented as a touch screen to receive input signals from the user. The touch panel may include one or more touch sensors to sense touches, slips, and gestures on the touch panel. The touch sensors may not only sense a boundary of a touch or slip action, but also sense a period of time and a pressure associated with the touch or slip action. In some examples, the multimedia component 2308 may include a front camera and/or a rear camera. The front camera and the rear camera may receive an external multimedia datum while the device 2300 is in an operation mode, such as a photographing mode or a video mode. Each of the front camera and the rear camera may be a fixed optical lens system or have focus and optical zoom capability.

The audio component 2310 is configured to output and/or input audio signals. For example, the audio component 2310 may include a microphone ("MIC") configured to receive an external audio signal when the device 2300 is in an operation mode, such as a call mode, a recording mode, and a voice recognition mode. The received audio signal may be further stored in the storage medium 2304 or transmitted via the communication component 2316. In some examples, the audio component 2310 further includes a speaker to output audio signals.

The I/O interface 2312 provides an interface between the operating component 2302 and peripheral interface modules, such as a keyboard, a click wheel, buttons, and the like. The buttons may include, but are not limited to, a home button, a volume button, a starting button, and a locking button.

The sensor component 2314 includes one or more sensors to provide status assessments of various aspects of the device 2300. For instance, the sensor component 2314 may detect an open/closed status of the device 2300, relative positioning of components, e.g., the display and the keypad, of the device 2300, a change in position of the device 2300 or a component of the device 2300, a presence or absence of user contact with the device 2300, an orientation or an acceleration/deceleration of the device 2300, and a change in temperature of the device 2300. The sensor component 2314 may include a proximity sensor configured to detect the presence of nearby objects without any physical contact. The sensor component 2314 may also include a light sensor, such as a CMOS or CCD image sensor, for use in imaging applications. In some examples, the sensor component 2314 may also include an accelerometer sensor, a gyroscope sensor, a magnetic sensor, a pressure sensor, or a temperature sensor.

The communication component 2316 is configured to facilitate communication, wired or wirelessly, between the device 2300 and other devices. The device 2300 may access a wireless network based on a communication standard, such as WiFi, 2G, or 3G, or a combination thereof. In one exemplary example, the communication component 2316 receives a broadcast signal or information associated broadcast externally from a broadcast management system via a broadcast channel. In one exemplary example, the communication component 2316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary examples, the device 2300 may be implemented with one or more application specific integrated circuits (ASICs), digital signal processors (DSPs), digital signal operating devices (DSPDs), programmable logic devices (PLDs), field programmable gate arrays (FPGAs), controllers, micro-controllers, microprocessors, or other electronic components, for performing the above described methods.

In exemplary examples, there is also provided a non-transitory machine-readable storage medium including instructions, such as included in the storage medium 2304, executable by the processor 2320 in the device 2300, for performing the above-described methods. For example, the non-transitory computer-readable storage medium may be a ROM, a RAM, a CD-ROM, a magnetic tape, a floppy disc, an optical data storage device, and the like.

Terms used in the present disclosure are only for the purpose of description of specific examples, and are not intended to limit the present disclosure. As used in the present disclosure and appended claims, the singular forms "a/an", "said" and "the" intend to also include the plural form, unless the content clearly dictates otherwise. It should also be understood that the term "and/or" used herein means to include arbitrary and all possible combinations of one or more items listed in association.

It should be understood that terms such as "first", "second", "third" and the like may be used herein for description of information. However, the information shall not be restricted to these terms. These terms are only intended to distinguish among information of the same type. For example, under the circumstance of not departing from the scope of the present disclosure, a first information can also be referred to as a second information, similarly, a second information can also be referred to as a first information. Depending on the context, term "if" used herein may be interpreted as "when", "while" or "in response to determining."

Optionally, the method of updating an operating system of an electric vehicle may further include: detecting a selection operation for the system update function; and generating the system update operation instruction in response to the selection operation for the system update function.

Optionally, detecting the selection operation for the system update function may include: sensing, by the user terminal, information of an action triggered by a user in a preset application interface; determining, by the user terminal, whether the information matches preset action information; and determining, by the user terminal, that the selection operation for the system update function is detected when the information matches the preset action information.

Optionally, detecting whether the electric vehicle is in use may include: sending, by the user terminal, a parameter query request to the electric vehicle so that the electric vehicle sends a current status parameter of the electric vehicle to the user terminal according to the parameter query request; receiving, by the user terminal, the current status parameter sent by the electric vehicle; and determining, by the user terminal, whether the electric vehicle is in use according to the current status parameter of the electric vehicle.

Optionally, the current status parameter may be a current load weight of the electric vehicle; and determining whether the electric vehicle is in use according to the current status parameter of the electric vehicle may include: determining, by the user terminal, whether the current load weight of the electric vehicle is greater than or equal to a preset weight threshold; determining, by the user terminal, that the electric vehicle currently is in use when the current load weight of the electric vehicle is greater than or equal to the preset weight threshold; or determining, by the user terminal, that the electric vehicle currently is in the standby status when the current load weight of the electric vehicle is less than the preset weight threshold.

Optionally, the current status parameter may be a current running speed of the electric vehicle, and determining whether the electric vehicle is in use according to the current status parameter of the electric vehicle may include: determining, by the user terminal, whether the current running speed of the electric vehicle is greater than or equal to a preset speed threshold; determining, by the user terminal, that the electric vehicle currently is in use when the current running speed of the electric vehicle is greater than or equal to the preset speed threshold; or determining, by the user terminal, that the electric vehicle currently is in the standby status when the current running speed of the electric vehicle is less than the preset speed threshold.

Optionally, detecting whether the electric vehicle is in use may include: sending, by the user terminal, a status query request to the electric vehicle so that the electric vehicle feeds back information indicating a current working status of the electric vehicle to the user terminal according to the status query request; receiving, by the user terminal, the information fed back by the electric vehicle; and determining, by the user terminal according to the information fed back by the electric vehicle, whether the electric vehicle currently is in use.

Optionally, the method may further include: detecting, by the electric vehicle, a selection operation for the system update function; and generating, by the electric vehicle, the system update operation instruction in response to the selection operation for the system update function.

Optionally, detecting the selection operation for the system update function may include: sensing, by the electric vehicle, information of an action triggered by a user in a preset application interface; determining, by the electric vehicle, whether the information matches preset action information; and determining, by the electric vehicle, that the selection operation for the system update function is detected when the information matches the preset action information.

Optionally, the processor may be further caused by the machine-executable instructions to: detect a selection operation for the system update function; and generate the system update operation instruction in response to the selection operation for the system update function.

When detecting the selection operation for the system update function, the processor may be further caused by the machine-executable instructions to: sense information of an action triggered by a user in a preset application interface; determine whether the information matches preset action information; and determine that the selection operation for the system update function is detected when the information matches the preset action information.

When detecting whether the electric vehicle is in use, the processor may be further caused by the machine-executable instructions to: send a parameter query request to the electric vehicle so that the electric vehicle sends a current status parameter of the electric vehicle to the user terminal according to the parameter query request; receive the current status parameter sent by the electric vehicle; and determine, according to the current status parameter of the electric vehicle, whether the electric vehicle is in use.

Optionally, the current status parameter is a current load weight of the electric vehicle, and when determining, according to the current status parameter of the electric vehicle, whether the electric vehicle is in use, the processor may be further caused by the machine-executable instructions to: determine whether the current load weight of the electric vehicle is greater than or equal to a preset weight threshold; determine that the electric vehicle currently is in use when the current load weight of the electric vehicle is greater than or equal to the preset weight threshold; or determine that the electric vehicle currently is in the standby status when the current load weight of the electric vehicle is less than the preset weight threshold.

Optionally, the current status parameter is a current running speed of the electric vehicle, and when determining, according to the current status parameter of the electric vehicle, whether the electric vehicle is in use, the processor may be further caused by the machine-executable instructions to: determine whether the current running speed of the electric vehicle is greater than or equal to a preset speed threshold; determine that the electric vehicle currently is in use when the current running speed of the electric vehicle is greater than or equal to the preset speed threshold; or determine that the electric vehicle currently is in the standby status when the current running speed of the electric vehicle is smaller than the preset speed threshold.

Optionally, when detecting whether the electric vehicle is in use, the processor may be caused by the machine-executable instructions to: send a status query request to the electric vehicle so that the electric vehicle feeds back information indicating a current working status of the electric vehicle to the user terminal according to the status query request; receive the information fed back by the electric vehicle; and determine, according to the information fed back by the electric vehicle, whether the electric vehicle currently is in use.

Optionally, the processor may be further caused by the machine-executable instructions to: detect a selection operation for the system update function; and generate the system update operation instruction in response to the selection operation for the system update function.

When detecting the selection operation for the system update function, the processor is further caused by the machine-executable instructions to:

sense information of an action triggered by a user in a preset application interface; determine whether the sensed information matches preset action information; and determine that the selection operation for the system update function is detected when the information matched the preset action information.

Technical solutions provided by the examples of the present disclosure may include following beneficial effects: according to the method of updating an operating system of the electric vehicle provided by the present disclosure, after receiving a user-triggered system update operation instruction, the system updating is not immediately carried out, instead it is first determined whether the electric vehicle is currently in use. The system update function is disabled when the electric vehicle is in use, thereby avoiding threat to user personal security or loss of property caused by sudden unbalance of the electric vehicle due to performing system update.

In the present disclosure, the user terminal may detect, in real time, a selection operation for the system update function. When the selection operation is detected, a system update operation instruction is generated, so that the user terminal performs subsequent blocks for determining the current usage status of the electric vehicle, thereby improving sensitivity of the electric vehicle or the user terminal in response to operating system update.

In the present disclosure, information of action triggered by a user may be sensed via a preset application interface, and the user's selection operation of the system update function is detected, so that the manner of updating operations using a detection system may be simple and convenient, the degree of intelligence of the user terminal may be enhanced, and the user experience may be improved.

In the present disclosure, after the electric vehicle receives the system update operation instruction, a current status parameter of the electric vehicle may be acquired, and it is determined whether the electric vehicle is in use according to the status parameter to prevent the user from mistakenly triggering a system update operation of the electric vehicle, thereby avoiding a threat to the user's personal security, enhancing the security of the electric vehicle, and improving the user experience.

In the present disclosure, when the user terminal linked in advance with the electric vehicle receives a system update operation instruction triggered by other users via a user terminal APP, the current status parameter of the electric vehicle may be acquired by sending a parameter query request to the electric vehicle, and it is determined whether the electric vehicle currently is in use according to the acquired status parameter. In this way, the status parameter may be quickly acquired, the data processing efficiency may be improved, and the security of the user riding on the electric vehicle may be effectively guaranteed.

In the present disclosure, by determining whether the electric vehicle currently is in use according to the current load weight of the electric vehicle, no matter the user is riding or gets on for riding, it may be accurately determined that the electric vehicle currently is in use. In this way, the personal security of the user may be guaranteed when the user is riding or gets on for riding.

In the present disclosure, by determining whether the electric vehicle currently is in use according to the current running speed of the electric vehicle, no matter the user is riding or the electric vehicle is in a remote control status of motion, it may be accurately determined that the electric vehicle currently is in use. In this way, it is ensured that no system update operation is executed when the electric vehicle is running, which avoids the running electric vehicle suddenly stopping or slowing down resulted from system update, thereby guaranteeing the running safety of the electric vehicle.

In the present disclosure, when the user terminal linked in advance with the electric vehicle receives a system update operation instruction triggered by other users via a user terminal APP, the current working status sent by the electric vehicle may be acquired by sending a status query request to the electric vehicle. In this way, the calculation amount of the user terminal may be reduced, and the operating efficiency may be improved.

In the present disclosure, when it is determined that the electric vehicle currently is in use, the current status of the system update function is first decided before disabling the system update function. When the system update function is in a disabled status, no corresponding operation needs to be carried out, thereby simplifying the operation process. When the system update function is in an enabled status, the system update function needs to be disabled. In this way, it is ensured that the system update function is accurately maintained in the disabled status when the electric vehicle is in use, thereby guaranteeing the personal security of the user.

In the present disclosure, when the electric vehicle is in the standby status, the personal safety of the user may be not affected by the system update. Therefore, the system update function may be maintained in the enabled status, so that the user triggers the system update function via an operation panel arranged on the electric vehicle or a mobile phone APP to implement the system update of the electric vehicle and improve the performance of the device.

Other examples of the present disclosure will be apparent to those skilled in the art from consideration of the specification and practice of the disclosure here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A user terminal, comprising:
a processor, and
a non-transitory machine-readable storage medium for storing machine-executable instructions;
wherein the processor is caused by the machine-executable instructions to:
determine whether an electric vehicle is in use when receiving a system update operation instruction, wherein the electric vehicle is an electric self-balancing vehicle, and the electric vehicle is determined in use when a current load weight of the electric vehicle is greater than a preset weight threshold;

when the electric vehicle currently is in use, disable a system update function of the electric vehicle; and when the electric vehicle currently is in a standby status, update a system for the electric vehicle in response to the system update operation instruction.

2. The user terminal according to claim 1, wherein the processor is further caused by the machine-executable instructions to:

detect a selection operation for the system update function; and generate the system update operation instruction in response to the selection operation for the system update function.

3. The user terminal according to claim 2, wherein when detecting the selection operation for the system update function, the processor is further caused by the machine-executable instructions to:

sense information of an action triggered by a user in a preset application interface;

determine whether the sensed information matches preset action information; and determine that the selection operation for the system update function is detected when the information matched the preset action information.

4. The user terminal according to claim 1, wherein when determining whether the electric vehicle is in use, the processor is further caused by the machine-executable instructions to:

send a parameter query request to the electric vehicle in a way that the electric vehicle sends a current status parameter of the electric vehicle to the user terminal according to the parameter query request;

receive the current status parameter sent by the electric vehicle; and determine whether the electric vehicle is in use according to the current status parameter of the electric vehicle.

5. The user terminal according to claim 4, wherein the current status parameter includes the current load weight of the electric vehicle; and when determining whether the electric vehicle is in use according to the current status parameter of the electric vehicle, the processor is further caused by the machine-executable instructions to:

determine whether the current load weight of the electric vehicle is greater than or equal to the preset weight threshold;

determine that the electric vehicle currently is in use when the current load weight of the electric vehicle is greater than or equal to the preset weight threshold; and determine that the electric vehicle currently is in the standby status when the current load weight of the electric vehicle is less than the preset weight threshold.

6. The user terminal according to claim 4, wherein the current status parameter includes a current running speed of the electric vehicle, and when determining whether the electric vehicle is in use according to the current status parameter of the electric vehicle, the processor is further caused by the machine-executable instructions to:

determine whether the current running speed of the electric vehicle is greater than or equal to a preset speed threshold;

determine that the electric vehicle currently is in use when the current running speed of the electric vehicle is greater than or equal to the preset speed threshold; and determine that the electric vehicle currently is in the standby status when the current running speed of the electric vehicle is less than the preset speed threshold.

7. The user terminal according to claim 1, wherein when determining whether the electric vehicle is in use, the processor is further caused by the machine-executable instructions to:

send a status query request to the electric vehicle in a way that the electric vehicle feeds back information indicating a current working status of the electric vehicle to the user terminal in response to the status query request;

receive the information fed back by the electric vehicle; and determine whether the electric vehicle currently is in use according to the information fed back by the electric vehicle.

8. A method for updating a system for an electric vehicle, comprising:

determining, by a processor in communication with the electric vehicle, whether the electric vehicle is in use when receiving a system update operation instruction, wherein the electric vehicle is an electric self-balancing vehicle, and the electric vehicle is determined in use when a current load weight of the electric vehicle is greater than a preset weight threshold;

when the electric vehicle currently is in use, disabling, by the processor, a system update function of the electric vehicle; and when the electric vehicle currently is in a standby status, updating, by the processor, the system for the electric vehicle in response to the system update operation instruction.

9. The method according to claim 8, further comprising:

detecting, by the processor, a selection operation for the system update function; and generating, by the processor, the system update operation instruction in response to the selection operation for the system update function.

10. The method according to claim 9, wherein detecting the selection operation for the system update function comprises:

sensing, by the processor, information of an action triggered by a user in a preset application interface;

determining, by the processor, whether the sensed information matches preset action information; and determining, by the processor, that the selection operation for the system update function is detected when the information matched the preset action information.

11. The method according to claim 8, wherein determining whether the electric vehicle is in use comprises:

sending, by the processor, a parameter query request to the electric vehicle in a way that the electric vehicle sends a current status parameter of the electric vehicle to the processor in response to the parameter query request;

receiving, by the processor, the current status parameter sent by the electric vehicle; and determining, by the processor, whether the electric vehicle is in use according to the current status parameter of the electric vehicle.

12. The method according to claim 11, wherein the current status parameter includes the current load weight of the electric vehicle; and determining whether the electric vehicle is in use according to the current status parameter of the electric vehicle, comprises:

determining, by the processor, whether the current load weight of the electric vehicle is greater than or equal to the preset weight threshold;

determining, by the processor, that the electric vehicle currently is in use when the current load weight of the electric vehicle is greater than or equal to the preset weight threshold; and determining, by the processor, that the electric vehicle currently is in the standby status when the current load weight of the electric vehicle is less than the preset weight threshold.

13. The method according to claim 11, wherein the current status parameter includes a current running speed of the electric vehicle; and determining whether the electric vehicle is in use according to the current status parameter of the electric vehicle, comprises:

determining, by the processor, whether the current running speed of the electric vehicle is greater than or equal to a preset speed threshold;

determining, by the processor, that the electric vehicle currently is in use when the current running speed of the electric vehicle is greater than or equal to the preset speed threshold; and determining, by the processor, that the electric vehicle currently is in the standby status when the current running speed of the electric vehicle is less than the preset speed threshold.

14. The method according to claim 8, wherein determining whether the electric vehicle is in use comprises:

sending, by the processor, a status query request to the electric vehicle in a way that the electric vehicle feeds back information indicating a current working status of the electric vehicle to the processor in response to the status query request;

receiving, by the processor, the information fed back by the electric vehicle; and determining, by the processor, whether the electric vehicle currently is in use according to the information fed back by the electric vehicle.

15. An electric vehicle, comprising:

a processor, and a non-transitory machine-readable storage medium for storing machine-executable instructions;

wherein the processor is caused by the machine-executable instructions to:

detect whether the electric vehicle is in use when receiving a system update operation instruction, wherein the electric vehicle is an electric self-balancing vehicle, and the electric vehicle is determined in use when a current load weight of the electric vehicle is greater than a preset weight threshold;

when the electric vehicle currently is in use, disable a system update function; and when the electric vehicle currently is in a standby status, update a system for the electric vehicle in response to the system update operation instruction.

16. The electric vehicle according to claim 15, wherein, the processor is further caused by the machine-executable instructions to:

detect a selection operation for the system update function; and generate the system update operation instruction in response to the selection operation for the system update function.

17. The electric vehicle according to claim 16, wherein when detecting the selection operation for the system update function, the processor is further caused by the machine-executable instructions to:

sense information of an action triggered by a user in a preset application interface;

determine whether the sensed information matches preset action information; and determine that the selection operation for the system update function is detected when the information matched the preset action information.

* * * * *